(12) United States Patent
Neoh

(10) Patent No.: US 7,692,626 B2
(45) Date of Patent: Apr. 6, 2010

(54) PERIPHERAL DEVICE AND HOUSING

(75) Inventor: Kenneth Neoh, Grant Town, WV (US)

(73) Assignee: Azimuth, Inc., Morgantown, WV (US)

( * ) Notice: Subject to any disclaimer, the term of this patent is extended or adjusted under 35 U.S.C. 154(b) by 343 days.

(21) Appl. No.: 10/710,220

(22) Filed: Jun. 28, 2004

(65) Prior Publication Data

US 2006/0007116 A1 Jan. 12, 2006

(51) Int. Cl.
*G09G 5/00* (2006.01)

(52) U.S. Cl. ...................... 345/156; 345/157
(58) Field of Classification Search .......... 345/156–184
See application file for complete search history.

(56) References Cited

U.S. PATENT DOCUMENTS

| | | | | |
|---|---|---|---|---|
| 5,004,871 A | * | 4/1991 | Purcell | 178/19.04 |
| 5,912,661 A | * | 6/1999 | Siddiqui | 345/166 |
| 2004/0046732 A1 | * | 3/2004 | Chesters | 345/156 |
| 2005/0159850 A1 | * | 7/2005 | Melman | 701/1 |

* cited by examiner

*Primary Examiner*—Sumati Lefkowitz
*Assistant Examiner*—Seokyun Moon
(74) *Attorney, Agent, or Firm*—Dinsmore & Shohl LLP; Monika J. Hussell

(57) ABSTRACT

A peripheral device and housing therefor, capable of being interfaced with a computer, for use in mobile environments, including without limitation highly dynamic environments such as high-speed watercrafts, comprising: a trigger-switch mechanism and/or a rotating cylinder mechanism, a tubular housing encasing the rotating cylinder mechanism, and a grip chamber housing encasing the trigger-switch mechanism, wherein the grip chamber housing is affixed to the tubular housing.

13 Claims, 4 Drawing Sheets

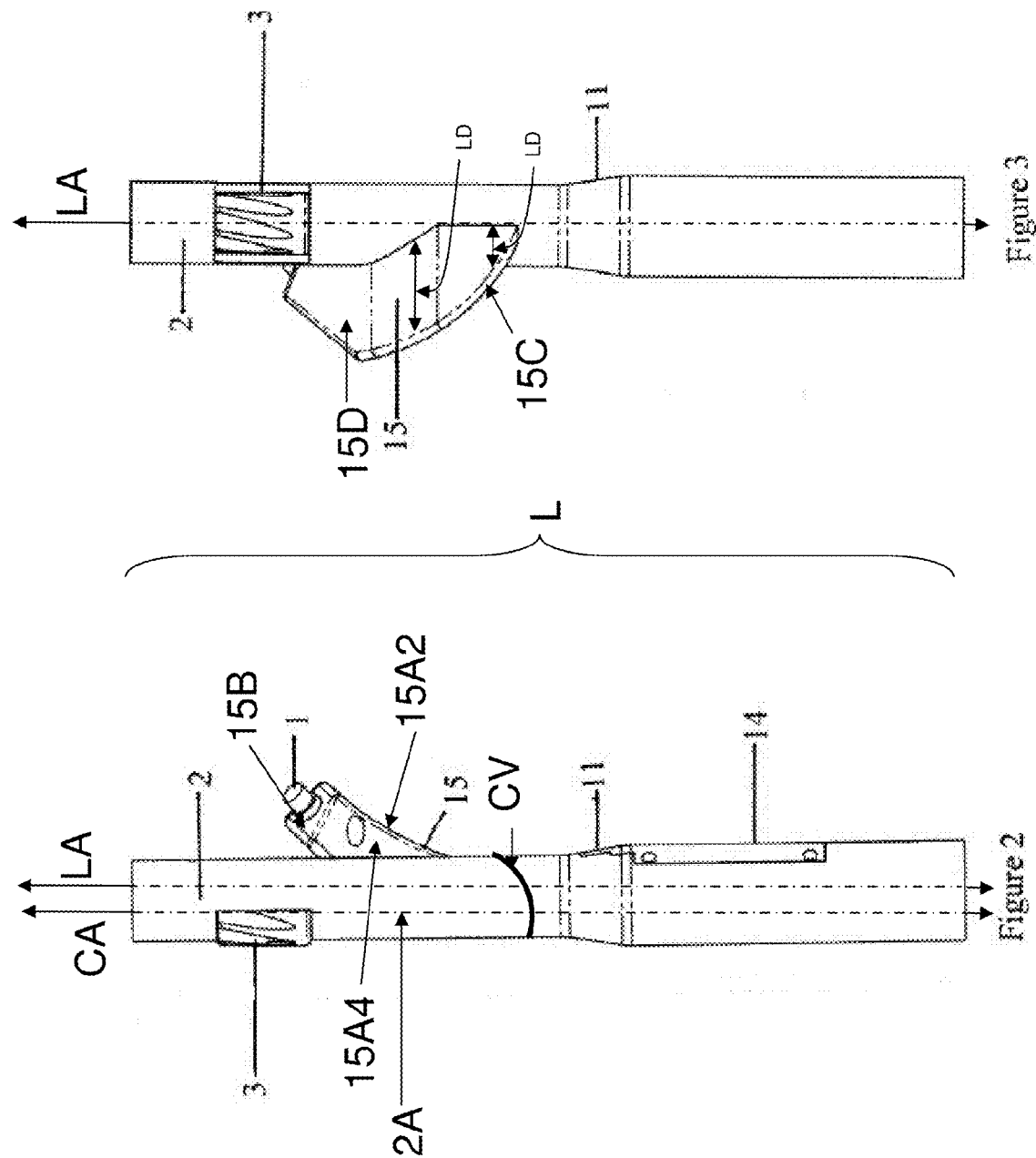

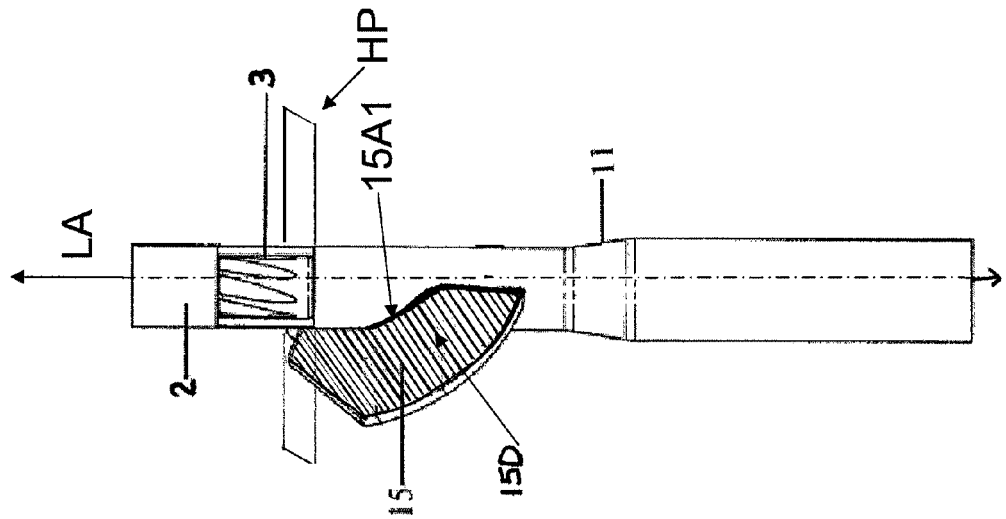
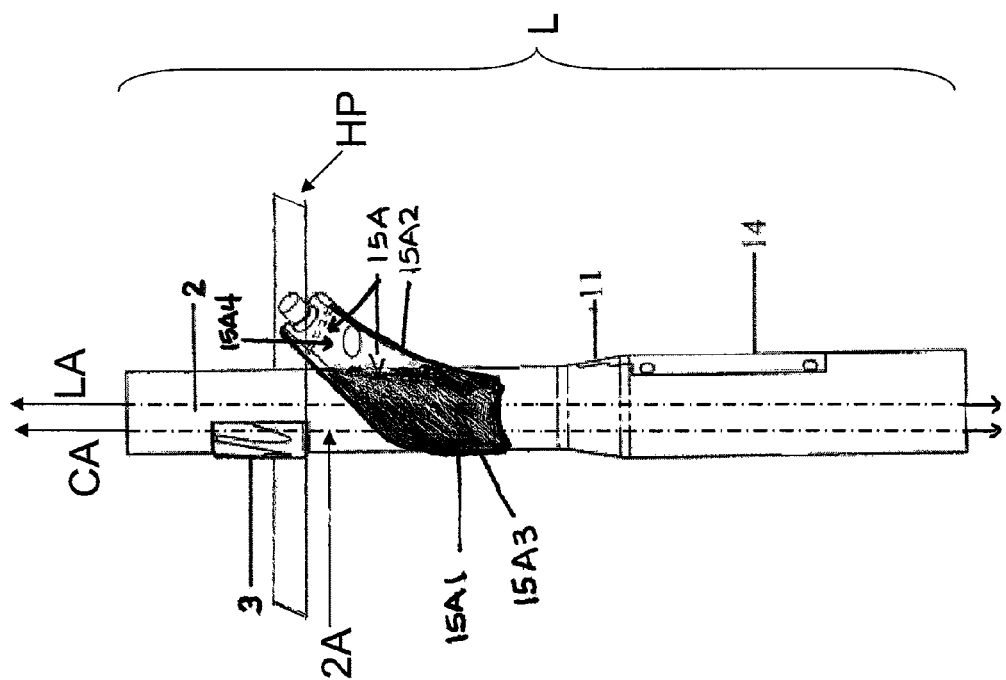

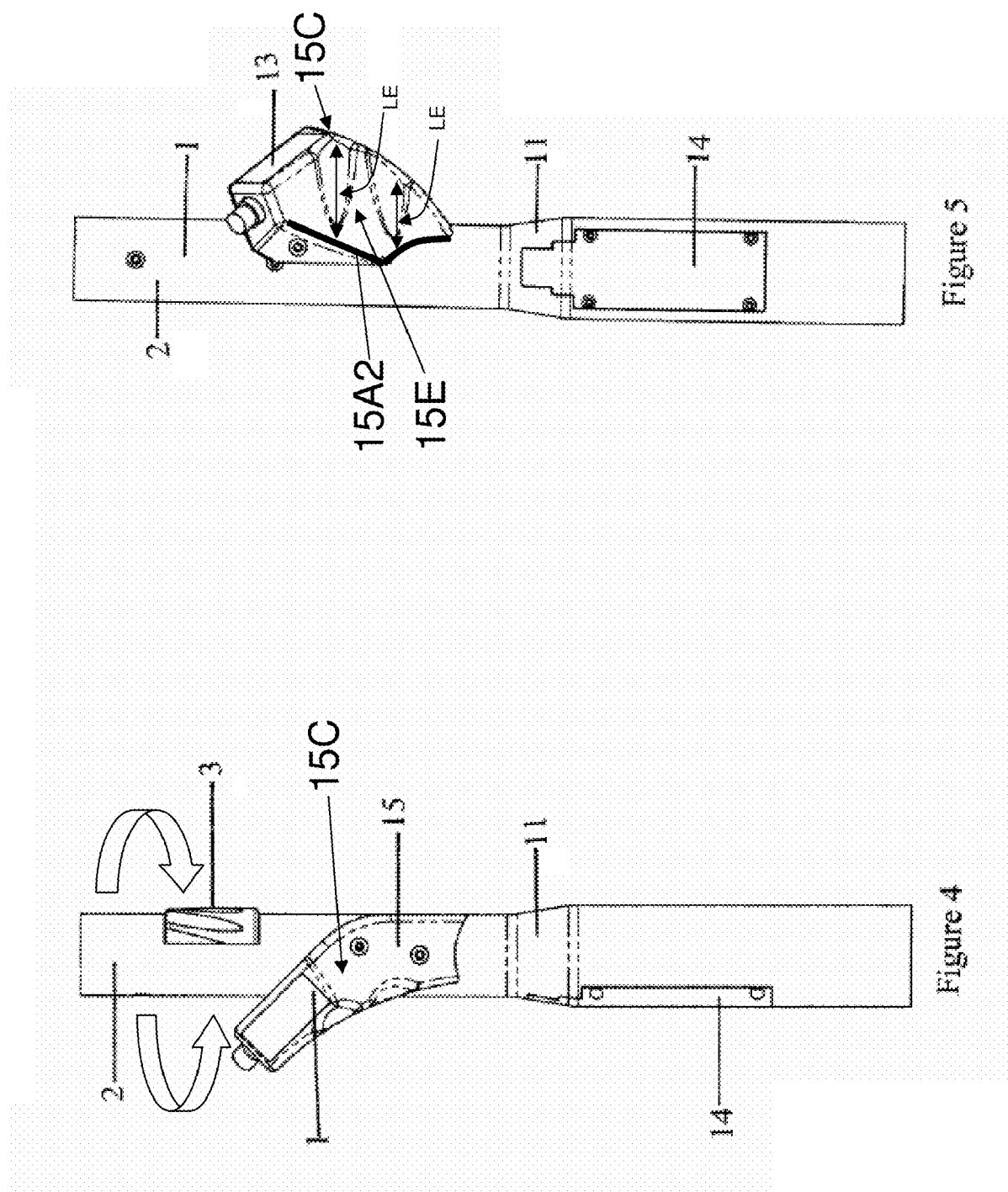

PERIPHERAL DEVICE AND HOUSING

SUMMARY OF INVENTION

The present invention regards a peripheral device and housing therefor, capable of being interfaced with a computer, for use in mobile environments, including without limitation highly dynamic environments such as high-speed watercrafts.

Some air, land and water crafts, particularly those used for military or policing operations, have computers on board which are used to assist the individuals on the craft with operation and navigation of the craft; weather and environmental conditions analysis; and surveillance, communication (s), and situational awareness. These computers are operated by users of the craft by means of peripheral devices, interfaced with the computers, such as keyboards, mice, trackballs and bezel mounted buttons. The peripheral device of the present invention is constructed to interface with such computers, and is incorporated into a handrail, seat armrest grip, or other portion of the craft which might function as a handhold for individuals on the craft.

BRIEF DESCRIPTION OF DRAWINGS

FIGS. 2 and 2A are right views of an embodiment of the present invention, wherein FIG. 2A cuts away the tube to show the bottom surface of the hand grip structure as hereinafter described.

FIGS. 3 and 3A are top views of the same embodiment of the present invention.

FIGS. 4 and 5 are left and bottom views, respectively, of the same embodiment of the present invention.

DETAILED DESCRIPTION

Figure 1:
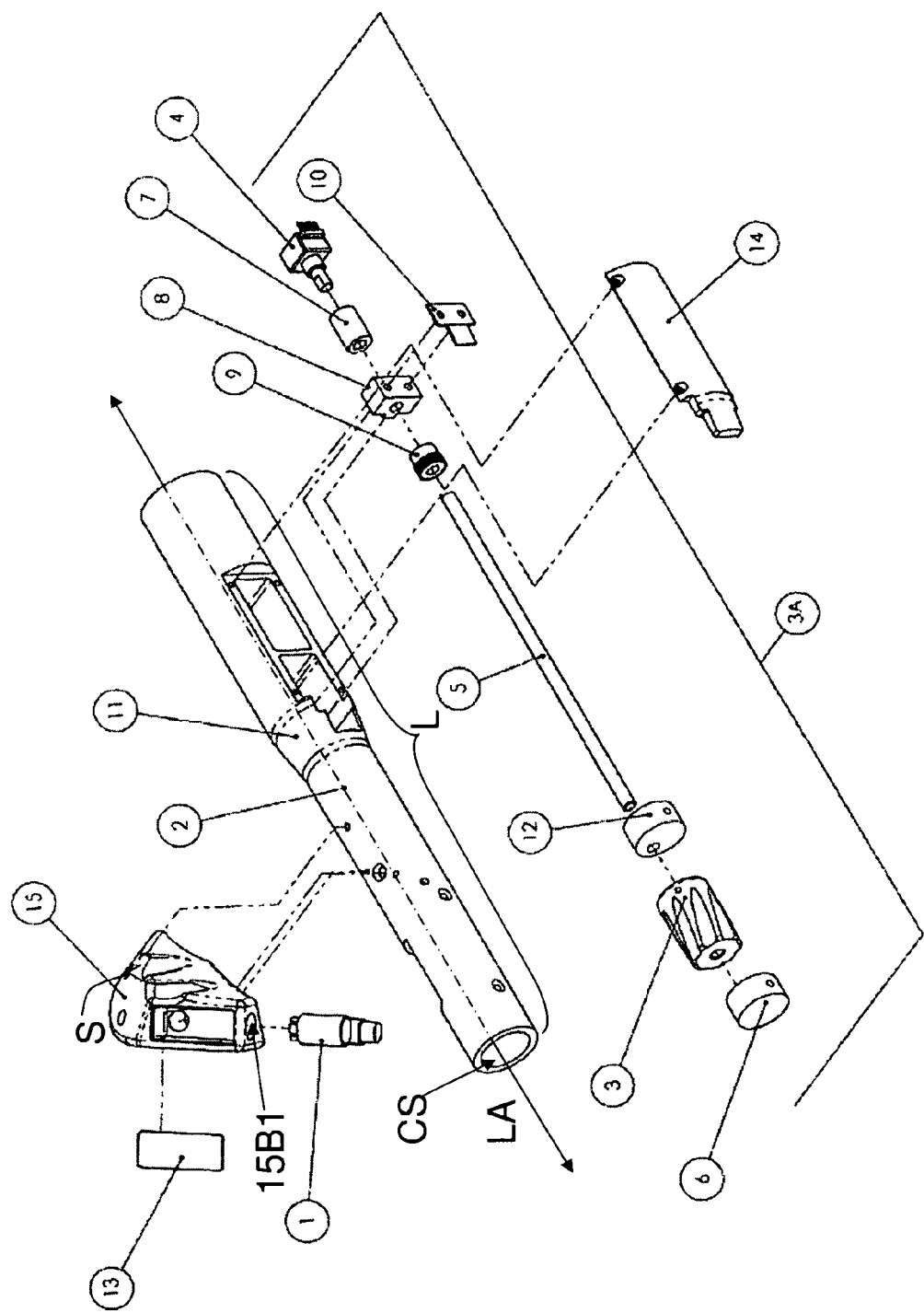
FIG. 1 is a part-by-part view of an embodiment of the present invention.

Referring to FIG. 1, an embodiment of the peripheral device of the present invention comprises a trigger-switch mechanism 1, a rotating cylinder mechanism 3A, a tubular housing 2 (having an exterior surface 2A also forming an exterior surface of the device) and a grip chamber 15. As shown in FIGS. 1-5, the tubular housing 2 partially houses the rotating cylinder mechanism 3 and comprises a circumferential surface, which is the surface along the circumference of the tubular housing 2, and one or more apertures in the circumferential surface. As used herein, "circumferential surface" refers to the peripheral surface of a tubular housing having a circular cross-section.

As shown in FIGS. 1-5, the housing 2 is a tubular housing defined by a length L, a longitudinal axis LA, a circular cross-section Cs, and a horizontal plane HP perpendicular to the longitudinal axis. The tubular housing 2 has an exterior surface 2A having a circular curvature CV along the length L of the tubular housing. This curvature corresponds to and forms the circular cross-section CS of the tubular housing 2.

Further, as depicted in the figures, the grip chamber 15 is a housing having a bottom surface 15A, at least one end surface 15B, a top surface 15C, and first and second side surfaces 15D and 15E, respectively. The bottom surface 15A has corresponding first and second edges 15A1 and 15A2 along the length thereof. This surface 15A is partially affixed, and partially unaffixed, to the exterior surface 2A of the tubular housing 2. The affixed portion 15A3 (shown with shading in FIG. 2A) has a concave surface corresponding to the circular curvature CV of the exterior surface 2A of the tubular housing 2, and with the unaffixed portion 15A4 (shown without shading in FIG. 2A) extending up, around, and out from the longitudinal axis LA of the tubular housing 2, unattached to the tubular housing. The first side surface 15D extends from the first edge 15A1 of the bottom surface 15A to the top surface 15C at varying lengths LD along the width thereof, and the second side surface 15E similarly extends from the second edge 15A2 of the bottom surface 15A to the top surface 15C, at varying lengths LE along the width thereof. However, the lengths LE of the second side surface 15E are, at some lateral points along the longitudinal axis LA of the tubular housing 2, longer than the corresponding lengths LD of the first side surface 15D. The top surface 15C of the grip chamber 15 is affixed to the first and second side surfaces 15D and 15E of the grip chamber 15, with a partial slope S formed along the top surface 15C from the longer lengths LE of the second side surface 15E as compared to the corresponding lengths LD of the first side surface 15D. Finally, the end surface 15B comprises a flat surface forming a coterminous end for each of the top 15C, bottom 15A and first and second side surfaces, 15D and 15E, with an aperture 15B1 through the end surface.

The trigger switch mechanism 1 may be a momentary contact pushbutton switch, and in a further embodiment of the present invention may provide tactile feedback to the user, whereby the switch is designed to operate such that the "draw" or resistance force of the pushbutton rises until the switch is actuated, when a sharp drop in said force occurs. The trigger switch mechanism 1 generates an electronic signal when the pushbutton is depressed and the switch is actuated.

The rotating cylinder mechanism 3A may comprise a cylinder 3, a rotary encoder 4, an encoder coupler 7, and a driveshaft 5 engaged with said cylinder 3, encoder coupler 7 and encoder 4, such that the encoder coupler 7, by means of the drive shaft 5, transmits rotational movement of the cylinder 3 to the encoder 4, which converts the same movement to electronic signals. To prevent inadvertent rotation of the cylinder 3 and the coupler 7 relative to the driveshaft 5, set screws may be incorporated therein and screwed to pre-ground flat spots on the driveshaft 5 at appropriate locations. Alternatively, some or all of the components of the rotating cylinder mechanism 3A (except the bearing blocks discussed below) may be machined or welded together as a single unit.

In an embodiment of the present invention, a detent wheel 9 and a detent spring 10 are incorporated into the rotating cylinder mechanism 3A by engagement of the detent wheel 9 with the driveshaft 5. The detent wheel 9 has ridges or teeth that contact the detent spring 10 to provide the operator with tactile feedback during rotation of the cylinder 3. Similar to the other afore-mentioned components of the rotating cylinder mechanism 3A, a set screw may be incorporated into the detent wheel 9, and screwed to pre-ground flat spots on the driveshaft 5, to engage the components.

The rotating cylinder mechanism 3A may be stabilized by supporting the driveshaft 5 with one or more bearing blocks 6, 12 and 8. The inside faces of the first two bearing blocks 6 and 12 act as thrust bearings to keep the cylinder 3 from shifting along its axis; further, the bearing blocks 6, 12 and 8 provide axial support to the rotating cylinder mechanism 3A. A hole may be drilled through or in each of the bearing blocks 6, 12 and 8 to accommodate the driveshaft 5, while allowing the driveshaft 5 to rotate freely within the bearing blocks 6, 12 and 8. The detent spring 10 may be affixed to bearing block 8 in functional relationship with the detent wheel 9.

The rotating cylinder mechanism 3A is removably or permanently housed within the tubular housing 2, which is securely affixed, directly or indirectly, to the craft. The rotating cylinder mechanism 3A may be affixed to the housing 2 by means of fasteners passing through the housing 2 into tapped holes in one or more of the bearing blocks 6, 12 and 8. To permit replacement and/or repair of the rotating cylinder mechanism 3A, the housing may have a housing cover 14 removably affixed to the housing 2, whereby upon removal of said housing cover 14, all or a portion of the rotating cylinder mechanism 3A may be exposed and repaired or replaced.

In an embodiment of the device of the present invention, the trigger switch mechanism 1 is housed partially within a grip chamber 15, affixed to, traversing along, and protruding from the previously described exterior surface 2A of the housing 2 and the device. The grip chamber 15 is further configured and positioned on the housing 2 to allow an operator of the present invention to have a secure grip on the housing 2, while simultaneously applying pressure to the trigger switch mechanism 1 and/or rotating the cylinder 3. More particularly, as shown in FIGS. 2-5, a portion of the grip chamber housing is affixedly wrapped about a portion of the circumferential surface of the tubular housing, with a remainder of the grip chamber housing removed from the tubular housing, protruding at an angle from a longitudinal axis of the tubular housing, and terminating with a flat apertured surface. The grip chamber housing partially houses the trigger switch mechanism such that a portion of the pushbutton switch projects from the aperture of the flat apertured surface of the grip chamber housing. The grip chamber housing corresponds with a hand grip of the user such that the user may securely grip the tubular housing and the grip chamber housing while applying pressure to the trigger switch mechanism or the rotating cylinder mechanism, or both simultaneously. In this embodiment, as shown in the figures, the tubular housing 2 partially houses the rotating cylinder mechanism such that the rotating cylinder mechanism 3A rotates bi-directionally about an axis CA parallel to the longitudinal axis LA of the tubular housing, and wherein the rotating cylinder mechanism and the trigger switch mechanism coexist in the same horizontal plane HP of the tubular housing. To permit replacement and/or repair of the trigger switch mechanism 1, the grip chamber 15 may have a switch chamber cover 13 removably affixed to the grip chamber 15, whereby said chamber cover 13 and grip chamber 15 are designed so that the removal of the chamber cover 13 will expose all or a portion of the trigger switch mechanism 1.

Various components of the trigger switch mechanism 1 and the rotating cylinder mechanism 3A, and/or all or portions of the housing 2 and the grip chamber 15, may be sealed from water, dirt and/or contaminants, as may be desirable based upon the application of the device of the present invention. In another embodiment of the present invention, the housing 2 may contain vents to permit water to enter and/or exit from portions thereof.

The trigger switch mechanism 1 and the rotary encoder 4 of the rotating cylinder mechanism 3A interface with a machine/computer by transmitting raw electronic signals thereto. Alternatively, circuitry may be integrated into the housing 2 which is designed to receive raw electronic signals from the trigger switch mechanism 1 and/or the rotary encoder 4, and translate the same into electronic signals that conform to a specific computer standard and are compatible with the associated computer software/hardware. The signals may be transmitted to the computer/machine by wireless means such as RF protocols including Bluetooth, 802.11 or custom wireless technology, or by wired technology such as a PS2 or USB port.

When installed and interfaced with a computer, a user may rotate the cylinder 3 with his thumb to cause the rotary encoder 4 to generate electronic signals which are then transmitted to the computer, allowing a user to scroll through a list of operations on a computer. When the desired operation is reached, the user may depress the trigger switch mechanism 1 with his index finger, actuating the switch thereof which generates an electronic signal, which is then transmitted to the computer to confirm that selection. Alternatively, a trigger switch mechanism 1 may be used alone, without the rotating cylinder mechanism 3A to simply advance from one informational display to the next and to select a desired operation by multiple, successive depressions. Additionally, the rotating cylinder mechanism 3A may be used, without the trigger switch mechanism 1, if the peripheral device of the present invention is used solely for generating and sending signals for scrolling through a list of information, where no operations or actions need to be selected.

In an embodiment of the device of the present invention, gentle tapers/flares 11 are incorporated into the housing 2 in the event the operator's grip slips during operation, minimizing risk of injury. In another embodiment, the device of the present invention is integrated with a portion of a handrail, seat armrest grip, or other handhold 16 on a craft, as shown in FIG. 3. For example, the peripheral device may be configured to incorporate into a handrail of the mobile craft such that the user may interact with the computer of the mobile craft through the peripheral device while utilizing the peripheral device as a hand-hold.

Thus, a peripheral device and housing therefor, capable of being interfaced with a computer, for use in mobile environments is provided. One skilled in the art will appreciate that the present invention can be practiced by other than the described embodiments, which are presented for purposes of illustration and not limitation, and the present invention is limited only by the claims that follow.

It is noted that recitations herein of a component of the present invention being "configured" to embody a particular property, function in a particular manner, etc., are structural recitations, as opposed to recitations of intended use. More specifically, the references herein to the manner in which a component is "configured" denotes an existing physical condition of the component and, as such, is to be taken as a definite recitation of the structural characteristics of the component.

The invention claimed is:

1. A peripheral device configured to interface with a computer, the peripheral device comprising a trigger-switch mechanism, a rotating cylinder mechanism, a tubular housing, and a grip chamber housing, wherein:

the tubular housing is defined by a length, a longitudinal axis, a circular cross-section, and a horizontal plane perpendicular to said longitudinal axis,
 said tubular housing further comprising an exterior surface having a circular curvature along the length of the tubular housing, said curvature corresponding to and forming the circular cross-section of the tubular housing;

the grip chamber housing has a bottom surface, at least one end surface, a top surface, and first and second side surfaces, wherein
 the bottom surface has corresponding first and second edges along the length thereof; further, the bottom surface is partially affixed and partially unaffixed to the exterior surface of the tubular housing, with the affixed portion having a concave surface corresponding to the circular curvature of the exterior surface of the tubular housing, and with the unaffixed portion extending up, around, and out from the longitudinal axis of the tubular housing, unattached to the tubular housing;

the first side surface extends from the first edge of the bottom surface at varying lengths along the width thereof, and the second side surface extends from the second edge of the bottom surface, at varying lengths along the width thereof, wherein the lengths of the second side surface corresponds to the lengths of the first side surface at the same lateral position along the longitudinal axis of the tubular housing, provided that some of the lengths of the second side surface are longer than the corresponding lengths of the first side surface;

the top surface is affixed to the first and second side surfaces, having a partial slope formed from the longer corresponding lengths of the second side surface as compared to the lengths of the first side surface;

the end surface comprises a flat surface forming a coterminous end for each of the top, bottom and first and second side surfaces, said end surface comprising an aperture;

the trigger switch mechanism comprises a pushbutton switch configured to generate an electronic signal when depressed by a user of the peripheral device;

the tubular housing partially houses the rotating cylinder mechanism such that the rotating cylinder mechanism rotates bi-directionally about an axis parallel to the longitudinal axis of the tubular housing, and the grip chamber housing partially houses the trigger switch mechanism such that a portion of the pushbutton switch projects from the aperture of the end surface of the grip chamber housing, wherein the rotating cylinder mechanism and the trigger switch mechanism coexist in the same horizontal plane of the tubular housing; and the grip chamber housing corresponds with a hand grip of the user such that the user may securely grip the tubular housing and the grip chamber housing while operating the trigger switch mechanism or the rotating cylinder mechanism, or both simultaneously.

2. The peripheral device of claim 1, wherein the rotating cylinder mechanism comprises: a cylinder, a rotary encoder, an encoder coupler, a driveshaft engaged with the cylinder, encoder coupler, and encoder, and one or more thrust bearings engaged with the driveshaft.

3. The peripheral device of claim 2, wherein the rotating cylinder mechanism further comprises a detent wheel and a detent spring, whereby the detent wheel is engaged with the driveshaft, and the detent spring is engaged with the detent wheel.

4. The peripheral device of claim 3, wherein the rotating cylinder mechanism further comprises an additional bearing block engaged with the driveshaft and affixed to the detent spring.

5. A peripheral device configured to interface with a computer of a mobile craft, the peripheral device comprising a trigger-switch mechanism, a rotating cylinder mechanism, a tubular housing, and a grip chamber housing, wherein:

the tubular housing is defined by a length, a longitudinal axis, and a circular cross-section, said tubular housing further comprising an exterior surface having a circular curvature along the length of the tubular housing, said curvature corresponding to and forming the circular cross-section of the tubular housing;

the grip chamber housing has a bottom surface, at least one end surface, a top surface, and first and second side surfaces, wherein the bottom surface has corresponding first and second edges along the length thereof; further, the bottom surface is partially affixed and partially unaffixed to the exterior surface of the tubular housing, with the affixed portion having a concave surface corresponding to the circular curvature of the exterior surface of the tubular housing, and with the unaffixed portion extending up, around, and out from the longitudinal axis of the tubular housing, unattached to the tubular housing;

the first side surface extends from the first edge of the bottom surface at varying lengths along the width thereof, and the second side surface extends from the second edge of the bottom surface, at varying lengths along the width thereof, wherein the lengths of the second side surface corresponds to the lengths of the first side surface at the same lateral position along the longitudinal axis of the tubular housing, provided that some of the lengths of the second side surface are longer than the corresponding lengths of the first side surface;

the top surface comprises a side edge, wherein the edge defines a length of the top surface; a portion of said edge is shaped as an arc, with the arc traversing from the affixed portion of the bottom surface and along at least a portion of the length of the top surface, and is further defined by a partial slope formed from the longer corresponding lengths of the second side surface as compared to the lengths of the first side surface;

the end surface comprises a flat surface forming a coterminous end for each of the top and bottom surfaces, said end surface comprising an aperture;

the trigger switch mechanism comprises a pushbutton switch configured to generate an electronic signal when depressed by a user of the peripheral device;

the tubular housing partially houses the rotating cylinder mechanism such that the rotating cylinder mechanism rotates in bi-directionally about an axis parallel to the longitudinal axis of the tubular housing, and the grip chamber housing partially houses the trigger switch mechanism such that a portion of the pushbutton switch projects from the aperture of the end surface of the grip chamber housing; and the grip chamber housing corresponds with a hand grip of the user such that the user may securely grip the tubular housing and the grip chamber housing while operating to the trigger switch mechanism or the rotating cylinder mechanism, or both simultaneously; and wherein each end of the tubular housing is incorporated into a handrail of the mobile craft such that the user may interact with the computer of the mobile craft through the peripheral device while utilizing the peripheral device as a hand-hold.

6. The peripheral device claim 5, wherein the rotating cylinder mechanism comprises: a cylinder, a rotary encoder, an encoder coupler, a driveshaft engaged with the cylinder, encoder coupler, and encoder, and one or more thrust bearings engaged with the driveshaft.

7. The peripheral device of claim 6, wherein the rotating cylinder mechanism further comprises a detent wheel and a detent spring, whereby the detent wheel is engaged with the driveshaft, and the detent spring is engaged with the detent wheel.

8. The peripheral device of claim 7, wherein the rotating cylinder mechanism further comprises an additional bearing block engaged with the driveshaft and affixed to the detent spring.

9. The peripheral device of claim 1, wherein the rotating cylinder mechanism is removably affixed within the tubular housing.

10. The peripheral device of claim 1, wherein the tubular housing comprises a housing cover removably affixed to the tubular housing such that at least a portion of the rotating cylinder mechanism is exposed with a removal of the housing cover from the tubular housing.

11. The peripheral device of claim 5, wherein the mobile craft is an aircraft, a land craft, or a watercraft.

12. The peripheral device of claim 1, wherein the tubular housing comprises one or more vents configured to permit water to pass through the tubular housing.

13. The peripheral device of claim 1, wherein the tubular housing comprises tapers or flares.

* * * * *